United States Patent [19]
Hayward

[11] Patent Number: 5,784,917
[45] Date of Patent: Jul. 28, 1998

[54] TRANSMISSION SHIFT CONTROL STRATEGY

[75] Inventor: Randy R. Hayward, Mapleton, Ill.

[73] Assignee: Caterpillar Inc., Peoria, Ill.

[21] Appl. No.: 813,960

[22] Filed: Mar. 3, 1997

[51] Int. Cl.$^6$ .................................................. F16H 59/72
[52] U.S. Cl. ......................................... 74/335; 477/97
[58] Field of Search ................................ 74/335; 477/97; 475/117

[56] References Cited

U.S. PATENT DOCUMENTS

| | | |
|---|---|---|
| 4,678,069 | 7/1987 | Yoshimura et al. .................. 192/33 |
| 5,069,084 | 12/1991 | Matsunu et al. ..................... 74/844 |
| 5,520,593 | 5/1996 | Yesel et al. ........................... 477/77 |
| 5,587,905 | 12/1996 | Yesel et al. ......................... 364/424 |

*Primary Examiner*—Dirk Wright
*Attorney, Agent, or Firm*—J. W. Burrows

[57] ABSTRACT

A shift control strategy is provided for an automatic transmission used in a machine that is started or operated with cold oil in the transmission. When the operating value of the oil in the transmission is below a predetermined level, as sensed by a temperature sensor or a viscosity sensor, a controller turns on an indicator lamp. When a shift lever is moved from the neutral position or moved to select a different direction of travel, the controller detects the amount of time the shift lever has been in the neutral position or out of the one direction of travel and compares the amount of time to a predetermined amount of time. If the amount of time is less than the predetermined amount of time, the controller flashes the indicator lamp, inhibits the engagement of the clutches for the desired gear ratio or new travel direction, and requires the shift lever be moved back to the neutral position.

9 Claims, 5 Drawing Sheets

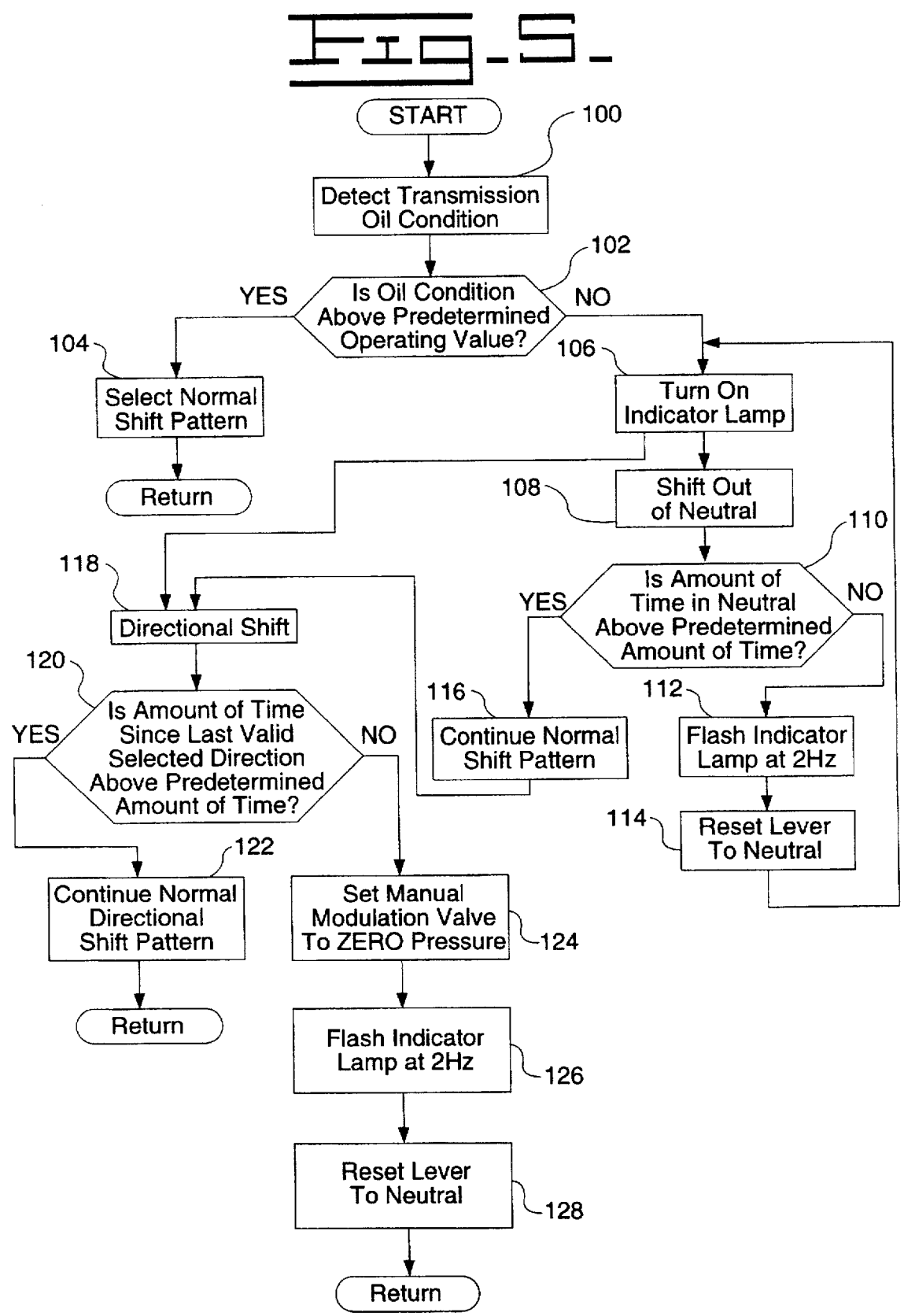
Fig-5-

TRANSMISSION SHIFT CONTROL STRATEGY

TECHNICAL FIELD

The present invention relates to generally to a transmission shift control strategy and more particularly to a transmission shift strategy for use in a machine when the machine is being started and operated with cold oil.

BACKGROUND OF THE INVENTION

Automatic transmissions are used in many machines and provide many advantages to the operator during normal work. In machines used today, such as motorgraders, there are many different gear ratios that are each provided by engaging certain ones of a plurality of fluid actuated clutches. These clutches are normally engaged by directing pressurized fluid through respective pressure modulation valves that are likewise controlled by solenoid actuated valves. The solenoid actuated valves are controlled in response to receipt of an electrical signal received from a controller. In order to provide a gradual, smooth increase in the pressurized fluid being directed to the respective clutches, various passages and orifices are used in the pressure modulation valves. Consequently, when the machine is being started and ran in a cold environment, the transmission oil is more viscous and does not freely flow through the passages and orifices. Since it is necessary to have various clutches engaged at one time for each gear ratio, it is very important that clutches not being used are properly drained so that two different gear ratios cannot be engaged at the same time. If two gear ratios are fully or partially engaged at the same time, the transmission can be damaged or the transmission may operated in a harsh manner causing irradiate operation of the machine. Furthermore, it may be necessary to operate the machine even through the transmission oil is cold. If it is necessary to operate the machine with cold oil, steps must be taken to ensure that only one gear ratio can be engaged at one time.

The present invention is directed to overcoming one or more of the problems as set forth above.

DISCLOSURE OF THE INVENTION

In one aspect of the present invention, a method is provided for controlling the shift strategy of an automatic transmission adapted for use on a machine being started or operated when the oil in the transmission is cold. The machine includes a source of pressurized fluid for pressurizing the fluid actuated clutches and a shift lever movable from a neutral position to select the desired direction of travel and the desired gear ratio. A signal is directed from the shift lever that is representative of the direction and gear ratio to a controller that controls engagement of certain ones of a plurality of fluid actuated clutches to obtain the desired direction and gear ratio. The method includes the steps of detecting an operating condition of the oil in the transmission, determining if the operating condition of the oil is above a predetermined operating value, turning on an indicator lamp if the operating condition of the oil is below the predetermined operating value, moving the shift lever from the neutral position to a desired directional and speed ratio position, comparing the amount of time the shift lever had been in the neutral position to a predetermined amount of time, flashing the indicator lamp if the amount of time the shift lever was in the neutral position is less than the predetermined amount of time, inhibiting engagement of the clutches for the gear ratio requested by the shift lever position if the amount of time is less than the predetermined amount of time, and requiring the shift lever be moved back to the neutral position to reset the controller.

These and other aspects, objects, features and advantages of the present invention will be more clearly understood and appreciated from a review of the following detailed description of the preferred embodiments and appended claims, and by the accompanying drawings.

BRIEF DESCRIPTION OF THE DRAWINGS

FIG. 5 is a flow chart depicting a method for controlling the shift strategy of an automatic transmission when the oil in the transmission is cold.

BEST MODE FOR CARRYING OUT THE INVENTION

Figure 1:
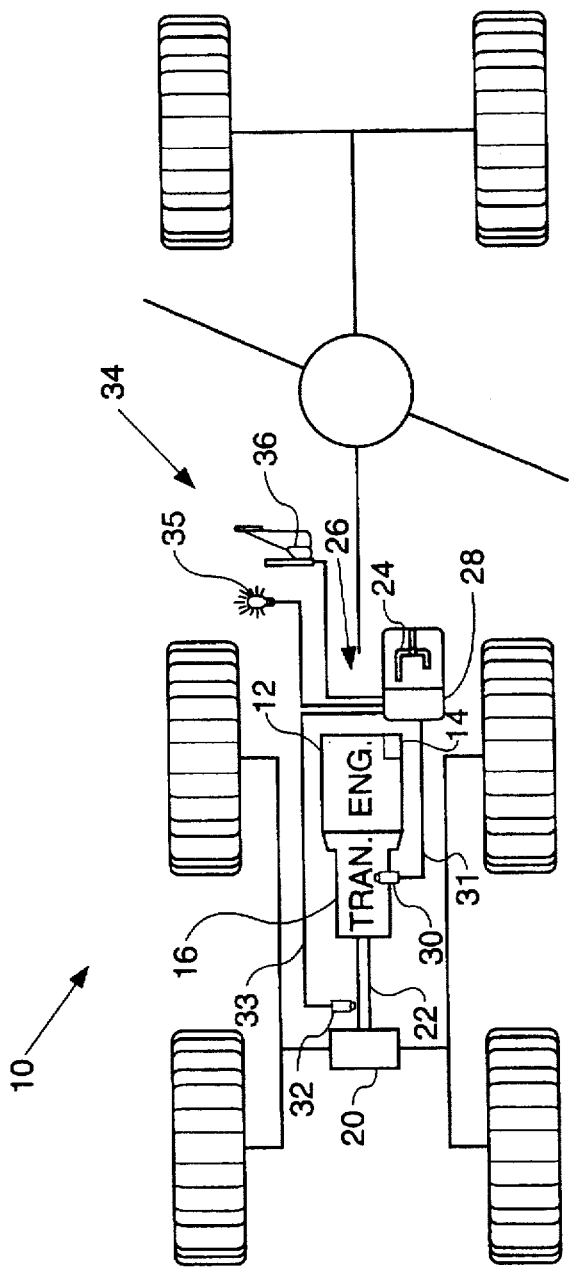
FIG. 1 is a diagrammatic representation of a machine incorporating an embodiment of the present invention.
Figure 2:
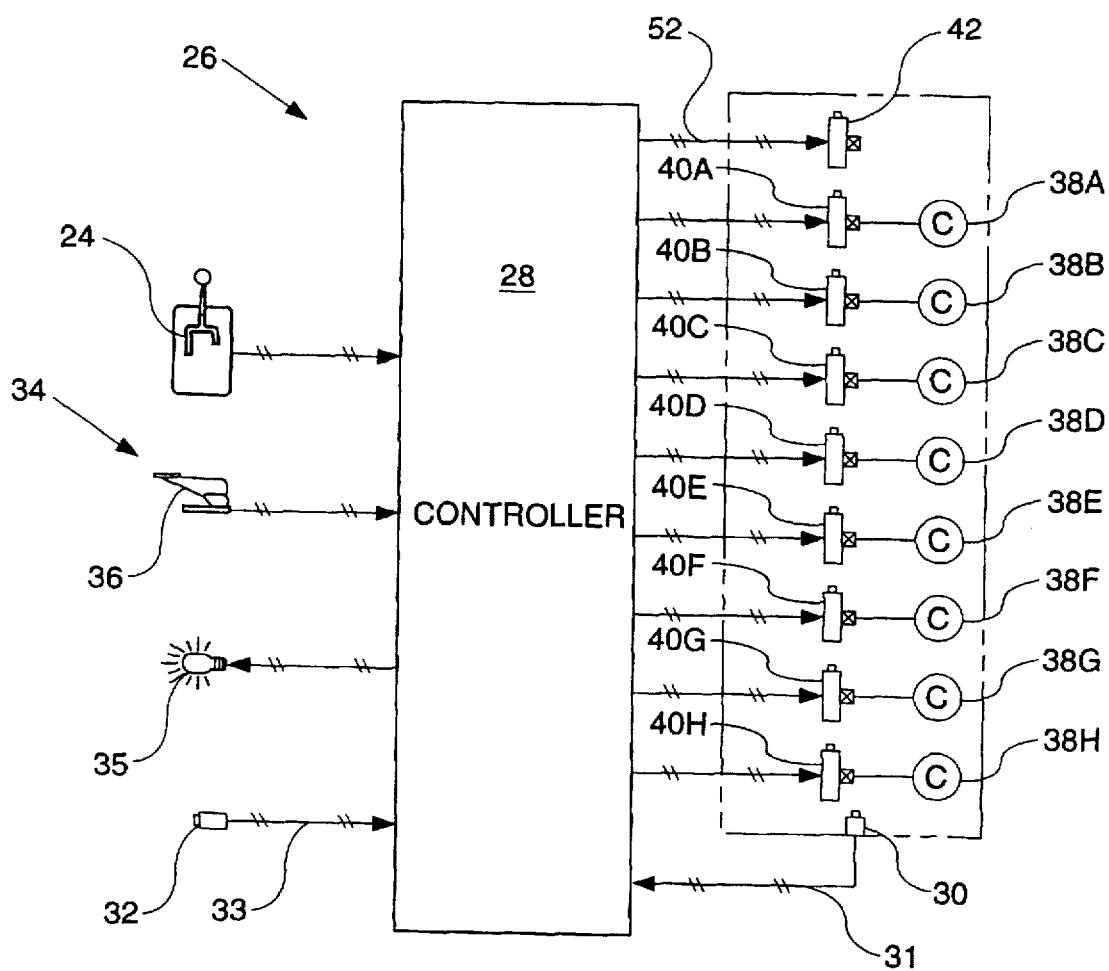
FIG. 2 is a partial diagrammatic and a partial schematic representation of a transmission control arrangement.

Referring to FIGS. 1–2, a machine 10, such as a motor grader, has an engine 12 with an engine throttle control 14 for controlling the engine speed. A transmission 16 is operatively connected to the engine 12 and coupled to a differential gearing 20 by a shaft 22. The transmission output is measured in terms of the speed of rotation of its output shaft 22 in rpm. The transmission 16 of the subject disclosure is an automatic transmission, but it is recognized that other types of fluid drive transmissions could be used. A shift lever 24 is associated with the transmission 16 for shifting the transmission from the park position to the neutral position and then between its various forward and reverse gear ratios. In the subject machine, there are eight forward gear ratios and six reverse gear ratios. It is recognized that other numbers of gear ratios could be utilized without departing from the essence of the subject invention.

The transmission 16 has a control system 26 that includes a controller 28 that is operative to receive various system parameters and control the transmission in response to the system parameters. The control system 26 further includes an oil operating condition sensor 30 that may be in the form of a temperature sensor or a viscosity sensor. The oil operating condition sensor 30 delivers a signal to the controller 28 through an electrical line 31 that is representative of the operating condition of the oil in the transmission 16.

A speed sensor 32 is operatively associated with the transmission output shaft 22 and operative to deliver a signal through an electrical line 33 to the controller 28 that is representative of the speed of the output shaft 22. The machine 10 also includes an operator control mechanism 34 that is operatively associated with the controller 28 and includes a foot pedal 36 that is movable from a 0% percent travel position toward a 100% travel position in response to the operator's desired input. A lamp indicator 35 is operatively associated with the controller 28 and operative to indicate that the transmission is not operating at its normal operating level.

As more clearly illustrated in FIG. 2, the transmission 16 includes a plurality of fluid actuated clutches 38A–H and the transmission control system 26 includes a plurality of pressure modulation valves 40A–H operatively connected to the plurality of fluid actuated clutches 38A–H. In the subject embodiment, the pressure modulation valves 40A–H are each solenoid actuated valves. The transmission control system 26 also includes a solenoid actuated manual modulation valve 42 that is operatively associated with the controller 28 and controlled in response to movement of the foot pedal 36.

The shift lever 24 is a multi-contact switch that sends position information to the controller 28 to indicate the desired direction of travel and the desired gear ratio for the transmission 16. When the transmission speed, as indicated by the speed sensor 32, and the engine speed permit a shift to the desired gear, the controller 28 sends the appropriate signals to the transmission control system 26 to provide the selected direction and gear ratio. As is known in the art, the appropriate solenoid actuated pressure modulation valves 40A–H operate the corresponding fluid actuated clutches 38A–H and thereby determine the actual travel and gear ratio of the transmission 16.

Figure 3:
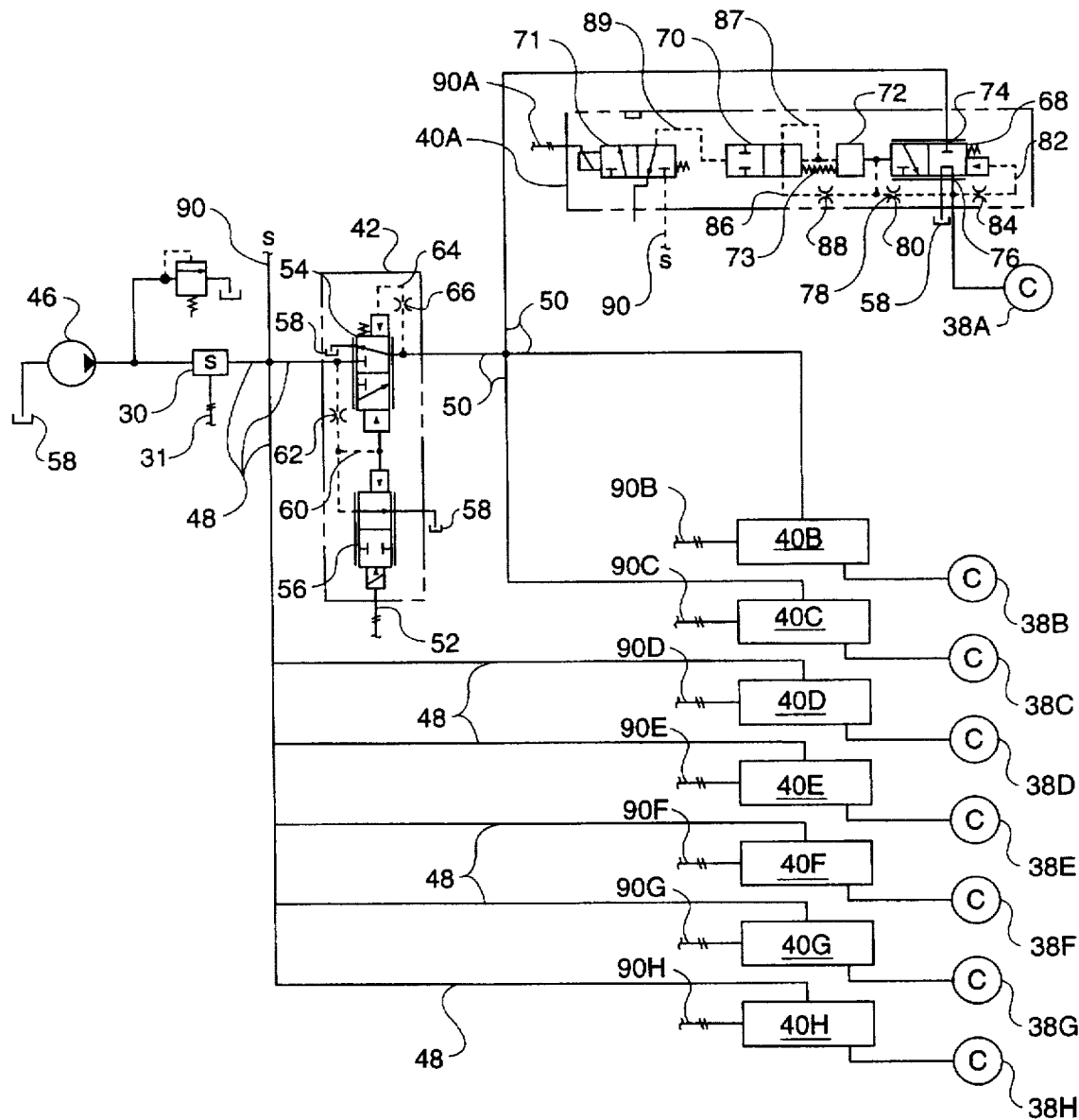
FIG. 3 is a schematic representation of a portion of the subject invention.

Referring to FIG. 3, the schematic illustrates that the machine 10 includes a source of pressurized fluid 46 that is operatively connected to the plurality of solenoid actuated pressure modulation valves 40A–H and the solenoid actuated manual modulation valve 42. More specifically, the source of pressurized fluid 46 is connected in parallel to the manual modulation valve 42 and the pressure modulation valves 40D–H by a supply conduit 48. The pressure modulation valves 40A–C are connected to the manual modulation valve 42 through a second supply conduit 50. The oil operating condition sensor 30 is disposed in the supply conduit 48 upstream of the respective manual modulation valve 42 and the plurality of pressure modulation valves 40A–H and delivers an electrical signal to the controller 28 through the electrical line 31. Even though the oil operating condition sensor 30 is illustrated as being in the supply conduit 48, it is recognized that it could be located in other areas of the hydraulic system, such as, in one of the drain lines associated with one of the modulation valves or in one of the pilot lines of the manual modulation valve 42.

The manual modulation valve 42 is a proportional valve that control the magnitude of pressure that is provided downstream thereof to the second supply conduit 50 in response to the magnitude of the electrical signal received from the controller 28 through an electrical line 52. The manual modulation valve 42 general includes a two-position, three-way pilot operated valve 54 and a two-position, two-way solenoid actuated valve 56. The pilot operated valve 54 is spring biased to a first position at which the second conduit 50 is in open communication with a reservoir 58 and the first supply conduit 48 is blocked. The pilot operated valve 54 is movable towards the second position at which the first conduit 48 is in fluid communication with the second supply conduit 50 and the reservoir 58 is blocked. The pilot operated valve 54 is movable towards the second position in response to pressurized fluid in a pilot conduit 60 that is in communication with the first supply conduit 48 through an orifice 62. The pilot operated valve 54 is also urged towards its first position by the force of the pressurized fluid in a conduit 64 that is in communication with the second supply conduit 50 through an orifice 66.

The solenoid actuated valve 56 is biased to its first position by the force of the pressurized fluid in the pilot conduit 60 at which the pilot conduit 60 is in open communication with the reservoir 58 and movable towards its second blocking position in response to the electrical signal received from the controller 28 through the electrical line 52.

Figure 4:
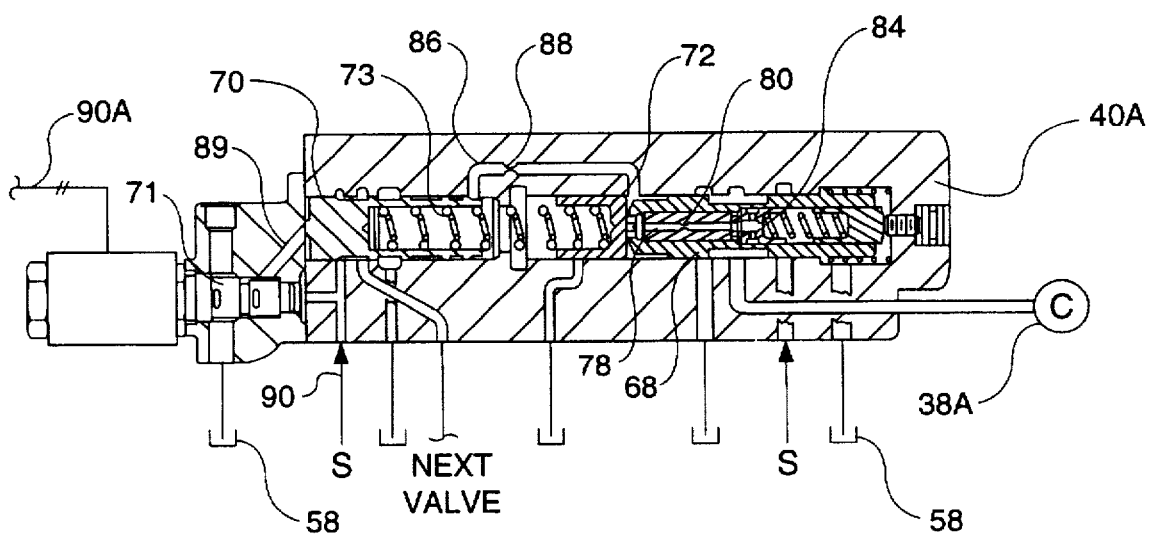
FIG. 4 is a diagrammatic representation of a portion of FIG. 3.

Each of the pressure modulation valves 40A–H are of the same construction and only one of them will be described in detail. The schematic representation illustrated in FIG. 3 is only a general representation of the pressure modulation valves and the hydraulic system. A diagrammatic representation is illustrated in FIG. 4. The only significant difference between the schematic representation and the diagrammatic representation is that the respective solenoid valves receive pressurized fluid from the source of pressurized fluid 46 and each solenoid valve has a flow inhibitor that prohibits flow to certain other ones of the solenoid valves when the solenoid is energized.

Each of the pressure modulation valves 40A–H includes a two-position, three-way pilot operated valve 68, a two-position, two-way pilot operated valve 70, a two-position solenoid operated valve 71, a load piston 72 and a spring 73 disposed between one end of the two-way pilot operated valve 70 and the load piston 72. An inlet 74 to the pilot operated valve 68 is connected to the appropriate supply conduit 48/50 and an outlet 76 thereof is connected to the respective fluid actuated clutches 38A–H. The pilot operated three-way valve 68 is spring biased to a first position at which the inlet 74 is blocked and the outlet 76 is in open communication with the reservoir 58. The pilot operated three-way valve 68 is movable towards the second position at which the inlet 74 is in open communication with the outlet 76 and the reservoir 58 is blocked. The pressurized fluid in a pilot conduit 78 that is connected to the pressurized fluid in the outlet 76 through an orifice 80 acts to bias the pilot operated three-way valve 68 towards its second position. The pilot operated three-way valve 68 is urged towards its first position in response to the pressurized fluid in a pilot conduit 82 that is connected to the pressurized fluid in the outlet 76 through an orifice 84.

The spring 73 biases the two-way pilot operated valve 70 towards a first position at which a conduit 86 is in open communication to an area within the spring chamber 73 through a conduit 87. The conduit 86 is connected to the conduit 78 through an orifice 88. The pressurized fluid in the conduit 78 also acts on the load piston 72 and is effective to increase the load on the spring 73. The two-way pilot operated valve 70 is movable towards its second position in response to receipt of pressurized fluid through a conduit 89 from the solenoid operated valve 71. The solenoid operated valve 71 is spring biased to a first position at which pressurized fluid in the conduit 89 is in communication with the reservoir 58. The solenoid operated valve 71 is movable towards its second position in response to electrical signal from the controller 28 through respective electrical lines 90A–H. With the solenoid operated valve 71 in its second position, the source of pressurized fluid 46 is in communication through conduits 90,89 with the end of the two-way pilot operated valve 71 that is opposite the spring 73.

Referring to FIG. 4, a diagrammatic illustration of the pressure modulation valve is shown. Corresponding schematic elements of FIG. 3 and diagrammatic elements of FIG. 4 have like element numbers. The FIG. 4 representation is provided primarily to illustrate the intricate passages and orifices that are included in the actual structure of the pressure modulation valves 40A–H.

Referring to FIG. 5, a flow chart depicts a method for controlling the shift strategy of a transmission that is being operated with cold oil in the transmission. Following the startup of the machine 10, a block 100 detects the transmission oil operating condition. This may be accomplished by sensing the temperature of the oil or by sensing the viscosity of the oil through the oil operating condition sensor 30. If the viscosity of the oil is sensed, it is recognized that as the oil reaches the normal operating condition the oil becomes more fluid. In the subject embodiment, reference will be made to sensing the temperature of the oil. However, it is recognized that sensing the viscosity of the oil could be utilized in place of sensing the temperature.

A decision block 102 determines whether the oil operating condition is above a predetermined operating value. The value of the oil's operating condition varies with a change in the temperature of the oil. For example, as the temperature decreases, the operating condition of the oil decreases. If the oil operating condition is above the predetermined operating value, a block 104 selects the normal shift pattern and normal operation of the transmission 16 continues. If the oil operating condition is below the predetermined operating value, a block 106 turns on the indicator lamp 35. A block 108 detects if the shift lever 24 has been moved from the neutral position to an operative position. A decision block 110 determines whether the amount of time that the shift lever 24 has been in the neutral/park position is above a predetermined amount of time. The predetermined amount of time is provided in a look-up table. Each amount of time provided in the look-up table is based on the temperature of the oil in the transmission 16. The colder the oil, the longer the amount of time. Therefore, the decision block 110 is comparing the amount of time that the shift lever 24 has been in the neutral/park position to the amount of time set forth in the look-up table for the temperature of the oil in the transmission 16 at that particular time. If the amount of time in neutral/park is not above the predetermined time, a block 112 flashes the indicator lamp at 2 Hz and a block 114 requires that the shift lever 24 be returned to neutral. Even though the operating condition of the oil may still be below the predetermined value, the machine 10 may still be operated if the operator keeps the shift lever 24 in the neutral position for at least the predetermined amount of time set forth in the look-up table. Once the shift lever 24 has been in the neutral position for the predetermined amount of time, a block 116 continues the normal shift pattern.

Block 118 detects any directional shift that may occur when the oil in the transmission 16 is below the predetermined operating value. If there is a directional shift, a decision block 120 determines if the amount of time since the last valid selected direction is above the predetermined amount of time set forth in the look-up table. If the amount of time is above the predetermined amount of time, a block 122 continues with the normal directional shift pattern. If the amount of time is not above the predetermined amount, a block 124 sets the manual modulation valve 42 to zero pressure level and a block 126 flashes the indicator lamp at 2 Hz. Block 128 requires that the shift lever 24 be reset to neutral. As indicated by the other line extending from block 106 to block 118, a directional shift can still be made with cold oil as long as the shift lever 24 remains in neutral or out of the last valid selected direction for the required predetermined amount of time.

As noted above, if the operating condition of the oil is being sensed by the viscosity sensor, the predetermined amounts of time set forth in the look-up table would be based on the viscosity of the oil at different conditions below the normal operating condition.

INDUSTRIAL APPLICABILITY

During the operation of the machine 10 incorporating the subject invention, the machine is permitted to operate even if the transmission oil is cold. However, the machine is subject to various restrictions based on how cold the oil is at the time of operation. If the temperature of the oil is quite cold, the machine will respond in a slow manner. Since the pressure modulation valves 40A–H have numerous passages and orifices, it is very difficult to get the oil to flow therethrough to engage or disengage the respective fluid actuated clutches 38A–H. Consequently, the transmission 16 could be subjected to partial or full engagement of opposing clutches that would be detrimental to the components of the transmission and/or cause the machine to operate in a harsh or jerky manner.

As set forth above, if the operating condition of the oil in the transmission is below a predetermined operating value, a new gear ratio or a change in direction cannot be performed unless the shift lever 24 has been in a predefined position for a predetermined amount of time. By requiring that the predetermined amount of time must lapse before the new gear ratio or the direction change can be made, the cold or more viscous oil contained in the pressure modulation valves 40A–H or the manual modulation valve 42 has the time needed to exit through the passages and orifices of the previously engaged pressure modulation valves to disengage the previously engaged clutch or clutches.

With this control strategy, it is possible to move the machine 10 prior to the machine being warmed to its normal operating condition. Even when the machine 10 is being moved with the oil in the transmission 16 below the predetermined operating value, the indicator lamp 35 is on. This indicates to the operator that the system is not ready to perform at its normal level.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications and that such changes do not depart from the true spirit and scope of the invention.

I claim:

1. A method for controlling the shift strategy of a transmission adapted for use on a machine being started or operated when the oil in the transmission is cold, the machine includes a source of pressurized fluid for pressurizing the fluid actuated clutches and a shift lever movable from a neutral position to select the desired direction of travel and the desired gear ratio and direct a signal representative thereof to a controller that controls engagement of certain ones of a plurality of fluid actuated clutches to obtain the desired direction and gear ratio, the method comprising the steps of:

detecting an operating condition of the oil in the transmission;

determining if the operating condition of the oil is above a predetermined operating value;

turning on an indicator lamp if the operating condition of the oil is below the predetermined operating value;

moving the shift lever from the neutral position to a desired directional and gear ratio position;

comparing the amount of time the shift lever had been in the neutral position to a predetermined amount of time;

flashing the indicator lamp if the amount of time the shift lever was in the neutral position is less than the predetermined amount of time;

inhibiting engagement of the clutches for the gear ratio requested by the shift lever position if the amount of time is less than the predetermined amount of time; and requiring the shift lever be moved back to the neutral position to reset the controller.

2. The method of claim 1 wherein in the step of comparing the amount of time the shift lever had been in the neutral position, the predetermined amount of time varies in response to changes in the operating value of the oil condition.

3. The method of claim 2 wherein in the step of comparing the amount of time the shift lever had been in the neutral position if the amount of time is the same as or larger than the predetermined amount of time, the clutches for the desired direction and gear ratio selected by the shift lever are engaged.

4. The method of claim 3 including the steps of shifting the shift lever from one direction of desired travel to the opposite direction of desired travel, determining the amount of time since the shift lever had been in the last valid opposite direction position, and comparing the amount of time since the shift lever had been in the last opposite direction position to the predetermined amount of time.

5. The method of claim 4 wherein the machine includes a pressure modulation valve operative to control the pressure level of the source of pressurized fluid being directed to at least some of the fluid actuated clutches and in the step of comparing the amount of time since the shift lever had been in the last opposite direction position if the amount of time since the last directional shift is less than the predetermined amount of time, the modulation valve is set to a zero pressure position and the indicator lamp is set to flash.

6. The method of claim 5 including the step of inhibiting engagement of the clutches for the opposite direction when the amount of time since the shift lever had been in the last directional shift position is less than the predetermined amount of time and requiring the shift lever be moved back to the neutral position to reset the controller.

7. The method of claim 4 wherein in the step of comparing the amount of time since the shift lever had been in the last directional shift position if the amount of time is equal to or greater than the predetermined amount of time, the opposite direction clutches are engaged in a normal manner.

8. The method of claim 6 wherein in the step of detecting the operating condition of the oil in the transmission a temperature sensor is located in the transmission and operable to detect the operating temperature of the oil and deliver an electrical signal representative of the oil temperature to the controller.

9. The method of claim 6 wherein in the step of detecting the operating condition of the oil in the transmission a viscosity sensor is located in the transmission and operable to detect the operating viscosity of the oil and deliver an electrical signal representative of the oil viscosity to the controller.

* * * * *